United States Patent
O'Lenick, Jr.

(10) Patent No.: US 6,384,173 B1
(45) Date of Patent: May 7, 2002

(54) SILICONE FUNCTIONALIZED TRICLOSAN

(75) Inventor: Anthony J. O'Lenick, Jr., Dacula, GA (US)

(73) Assignee: Siltech LLC, Dacula, GA (US)

( * ) Notice: Subject to any disclaimer, the term of this patent is extended or adjusted under 35 U.S.C. 154(b) by 0 days.

(21) Appl. No.: 09/802,607

(22) Filed: Mar. 12, 2001

(51) Int. Cl.[7] .................................................. C08G 77/24
(52) U.S. Cl. ............................. 528/29; 528/41; 528/42; 556/439
(58) Field of Search ............................. 528/29, 41, 42; 556/439

(56) References Cited

U.S. PATENT DOCUMENTS

| | | | | |
|---|---|---|---|---|
| 5,296,625 A | * | 3/1994 | O'Lenick, Jr. et al. | 556/437 |
| 5,733,529 A | * | 3/1998 | Hill et al. | 424/49 |
| 6,168,782 B1 | * | 1/2001 | Lin et al. | 424/78.03 |
| 6,197,072 B1 | * | 3/2001 | Li | 8/490 |

\* cited by examiner

*Primary Examiner*—Margaret G. Moore

(57) ABSTRACT

This invention relates to composition of matter of certain triclosan functionalized silicone polymers useful to make substantive antimicrobial agents. These compounds impart long-lasting durable antimicrobial, germicidal, and fungicidal properties to textiles which has heretofore not been achieved with triclosan alone. The compounds are made by the reaction of triclosan and a silicone methyl ester.

8 Claims, No Drawings

SILICONE FUNCTIONALIZED TRICLOSAN

FIELD OF THE INVENTION

This invention relates to composition of matter of certain triclosan functionalized silicone polymers useful to make substantive antimicrobial agents. These compounds impart long-lasting durable antimicrobial, germicidal, and fungicidal properties to textiles which has heretofore not been achieved with triclosan alone.

BACKGROUND AND ART

There has been a great deal of attention in recent years given to the hazards of antimicrobial contamination from potential everyday exposure. Noteworthy examples of such concern include the fatal consequences of food poisoning due to certain strains of *Eschericia coli* being found within undercooked beef in fast food restaurants; Salmonella contamination causing sicknesses from undercooked and unwashed poultry food products; and illnesses and skin infections attributed to *Staphylococcus aureus*, yeast, and other unicellular organisms. With such an increased consumer interest in this area, manufacturers have begun introducing antimicrobial agents, such as triclosan, available from Ciba-Geigy under the tradename Irgasan®., within various household products. For instance, certain brands of polypropylene cutting boards, liquid soaps, etc., all contain this very effective antimicrobial compound. Generally, the incorporation of triclosan within liquid or polymeric media has been relatively simple. However, there is a long-felt need to provide effective, durable, and long-lasting antimicrobial characteristics within textiles, in particular apparel fabrics, which is extremely difficult to accomplish with triclosan. There are commercially available textile products comprising acrylic and/or acetate co-extruded with triclosan (for example Hoechst Celanese markets such acetate fabrics under the name Microsafe® and Courtaulds markets such acrylic polymer fabric under the name Amicor®.). However, such an application is limited to those types of fibers; it does not work specifically for and within polyester, polyamide, cotton, lycra, etc., fabrics. Furthermore, this co-extrusion procedure is very expensive, particularly when compared to the inventive process.

Triclosan and its derivatives, as well as the antimicrobial properties possessed by such compounds, have been taught within U.S. Pat. Nos. 3,506,720 and 3,904,696, both to Model et al., U.S. Pat. No. 3,929,903, to Noguchi et al., and Swiss Patent 459,656, to Bindler et al., Textile surface treatments incorporating triclosan and triclosan derivatives have also been taught in order to impart temporary antimicrobial characteristics to apparel fabrics. Triclosan and its derivatives, and dispersions thereof, are favorable textile treatment agents most notably because of their low toxicity to skin, as well as their high levels of antimicrobial, germicidal, etc., activity. However, because of its high volatility at elevated temperatures and its high solubility within high pH aqueous media, triclosan tends to easily wash off a fabric substrate after very few laundry applications. Also, as noted above, chlorine bleach readily reacts with triclosan thereby decreasing its antimicrobial capabilities. Textile treatments incorporating triclosan and its derivatives, including some esterified products, are disclosed within U.S. Pat. No. 3,753,914, to Berth et al., and Swiss Patent 450,347, to Bindler. Neither of these patents teach nor fairly suggest a procedure whereby a triclosan ester is specifically diffused within individual fibers of a fabric, thereby providing long-lasting bactericidal, fungicidal, germicidal, etc., effect on the fabric substrate. The Swiss patent discusses impregnating a fabric; however, such a treatment is merely a surface application, which fills the interstices between the yarns (as defined within the Dictionary of Fiber & Textile Technology). This difference between the prior art and the inventive process is particularly distinguishable since diffusion requires very high temperatures in order to fully effectuate the introduction of the triclosan within each individual fiber. Furthermore, the amounts of triclosan and triclosan derivatives applied to the fabrics within the teachings of this reference are much too low for durability within standard washing operations. Thus, there is no teaching or fair suggestion which provides for a long-lasting antimicrobial treatment for textile fabrics.

U.S. Pat. No. 6,197,072 issued Mar. 6, 2001 to Li discloses a process for providing antimicrobial properties using are triclosan esters. The particular esters are triclosan propionate, triclosan benzoate, triclosan-4-nitrobenzoate, and triclosan hexanoate. The selection of a silicone backbone provides products that are polymeric and that provide far more substantivity that do the simple fatty esters of the Li patent. As will also become clear the Li technology does not allow for the significant modification of solubility of the triclosan in silicone.

All U.S. Patents cited within this disclosure are herein entirely incorporated by reference.

DESCRIPTION OF THE INVENTION

Objective of the Invention

It is the object of the invention to provide silicone functionalized antimicrobial compounds that provide an improved, long-lasting antimicrobial finish for use in personal care and textile applications.

SUMMARY OF THE INVENTION

The compounds of the present invention conform to the following structure:

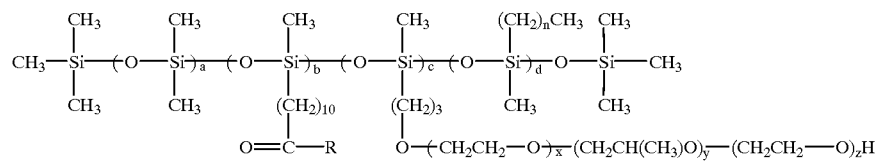

wherein;
a is an integer ranging from 0 to 2000;
b is an integer ranging from 1 to 20;
c is an integer ranging from 1 to 20;
d is an integer ranging from 0 to 20;
n is an integer ranging from 10 to 20;
x is an integer ranging 0 to 20;

y is an integer ranging 0 to 20;
z is an integer ranging 0 to 20;
R is:

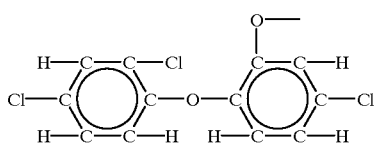

DETAILED DESCRIPTION OF THE INVENTION

The silicone esters of the present invention are made by the reaction of triclosan and certain methyl ester containing silicone compounds.

Triclosan conforms to the following structure:

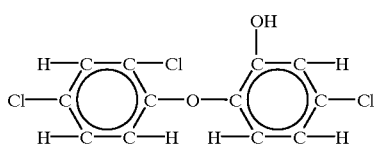

The OH group is reacted with a carboxy methyl ester silicone conforming to the following structure:

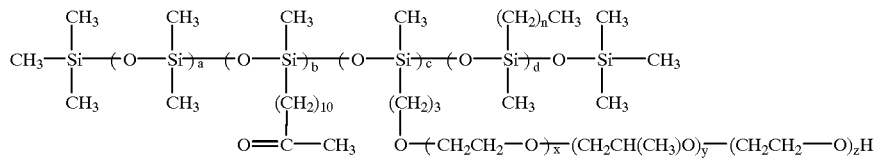

To give the desired compounds:

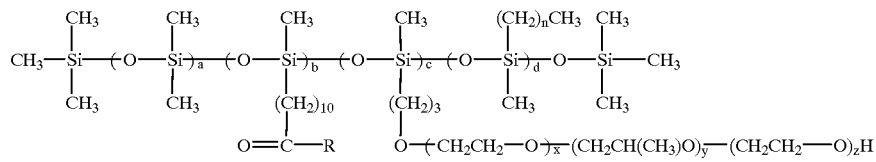

wherein;

a is an integer ranging from 0 to 2000;

b is an integer ranging from 1 to 20;

c is an integer ranging from 1 to 20;

d is an integer ranging from 0 to 20;

n is an integer ranging from 10 to 20;

x is an integer ranging 0 to 20;

y is an integer ranging 0 to 20;

z is an integer ranging 0 to 20;

R is:

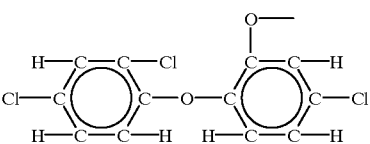

It should be clear that the compounds of the present invention offer the possibility of making antimicrobial products that can be used in many different applications areas. Products can be made with varying solubility in water, silicone compounds, and oil. The different solubilities of the compounds come by changing the values of "a", "C" and "d" in the molecule. By increasing the value of "a" increased silicone solubility is achieved. By increasing the value of "c", increased water solubility is achieved. Alternatively, by increasing the values of "x", "y" and "z" differing water solubility can be achieved. Finally, by increasing the value of "d", the oil solubility will increase. Interestingly, by increasing the value of "b" the amount of active biocide in the molecule will increase. The ability to place the antimicrobial into any solvent desired allow for the formulation of products that have the maximum protection.

The silicone ester derivative of triclosan as contemplated by this invention has improved substantivity to hair, skin, fabrics and other substrates and as such is not prone to wash off these substrates. The fact that the compounds of the present invention are esters makes them slowly hydrolyze to release the very triclosan molecule that is the active biocide. The hydrolysis is accelerated by microbial action on the substrate. In effect the start of microbial action results in the degradation of the silicone ester releasing the active antimicrobial This method results in delivery when needed. It is the most effective, most environmentally friendly way to provide anti-microbial protection to substrates.

The amount of silicone triclosan ester necessary to properly effectuate the desired long-lasting antimicrobial characteristics to the substrate depends upon the substrate bring treated. The ratio of wt % between the substrate and the weight of silicone triclosan ester should be from about 100:0.01 to about 100:1. Preferably, this range is from about 100:0 03 to about 100:0.6, and most preferably from about 100:0.1 to about 100:0.25.

EXAMPLES

Silicone Methyl Ester

The ethyl ester is prepared by the hydrosilylation reaction of a silicone polymer and specific alpha vinyl compounds.

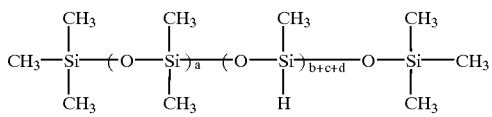

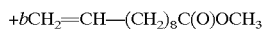

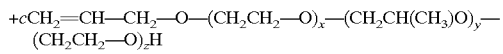

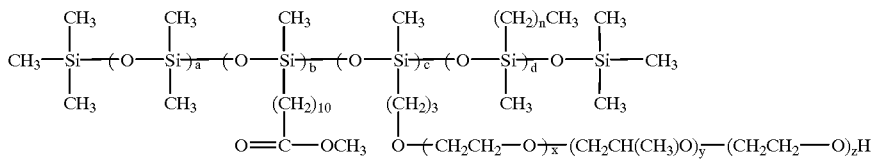

wherein;

a is an integer ranging from 0 to 2000;

b is an integer ranging from 1 to 20;

c is an integer ranging from 1 to 20;

d is an integer ranging from 0 to 20;

n is an integer ranging from 10 to 20;

x is an integer ranging 0 to 20;

y is an integer ranging 0 to 20;

z is an integer ranging 0 to 20;

The reparation of the intermediate is critical to the synthesis of the compounds of the present invention. If one tries to hydrosilylate a carboxylic acid directly, the reaction fails. The carboxylic acid group reacts with the Si—H and the desired product is not achieved. The hydrosilylation using the methyl ester however is essentially quantitative and proceeds to give the desired product.

EXAMPLES

1. Polymer Synthesis

Preparation of Silanic Hydrogen Containing Intermediates

Silicone intermediates of the type used to make the compounds of this invention are well known to those skilled in the art. International Publication ( Silicone Alkylene Oxide Copolymers As Foam Control Agents) WO 86/0541 by Paul Austin (Sep. 25, 1986) p.16 (examples 1 to 6) teaches how to make the following intermediates, and is incorporated herein by reference.

Hydrosilylation

Silanic Hydrogen Containing Compounds (Comb Type)

The polymers used as raw materials are known to those skilled in the art and conform to the following structure:

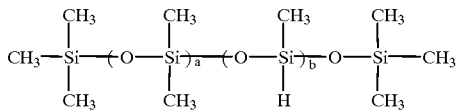

Compounds of this type are available from Siltech Corporation Toronto Ontario Canada.

| Example | Austin Example | a | b | Average Molecular Weight | Equivalent Molecular |
|---|---|---|---|---|---|
| 1 | 1 | 20 | 3 | 1,850 | 551 |
| 2 | 4 | 160 | 5 | 24,158 | 4,831 |
| 3 | 6 | 20 | 10 | 2,258 | 225 |

Compounds of this type are also available commercially from Siltech Corporation Toronto Ontario Canada The structures were determined using silicone nmr and the chemistries were described using experimentally determined structures. Trade names are given merely for reference.

| Example | Siltech Name | a | b |
|---|---|---|---|
| 4 | Siltech D-116 | 9 | 4 |
| 5 | Siltech H-345 | 22 | 5 |
| 6 | Siltech C-106 | 50 | 10 |
| 7 | Siltech ZZ-302 | 70 | 20 |
| 8 | Siltech XX-456 | 50 | 60 |
| 9 | Siltech J-456 | 10 | 20 |
| 10 | Siltech G-456 | 0 | 60 |

2. Methyl Undecylenate

Example 11

Methyl undecylenate is an item of commerce and conforms to the following structure:

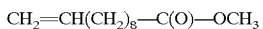

As previously stated, the reaction requires the reaction of an ester, not the acid directly. The reason for this is that is the reaction is conducted using undecylenic acid the acid group reacts with the Si—H and does not give the desired product. This is a critical unappreciated step in the practice of this technology.

3. Alkoxylated Allyl Alcohols

Alkoxylated allyl alcohol conforms to the following structure:

wherein x and y are integers independently ranging from 0 to 20.

Compounds of this type are also available commercially from Siltech Corporation Toronto Ontario Canada. The structures were determine using carbon nmr and wet analysis. The chemistries were described using experimentally determined structures. Trade names are given merely for reference.

| Example | x | y |
|---------|----|----|
| 12 | 0 | 0 |
| 13 | 8 | 0 |
| 14 | 20 | 20 |
| 15 | 16 | 8 |
| 16 | 5 | 5 |
| 17 | 25 | 25 |
| 18 | 12 | 6 |
| 19 | 9 | 9 |
| 20 | 0 | 9 |

4. Alpha Olefin

Alpha olefins are items of commerce and are available from a variety of sources including Chevron. They conform to the following structure:

$CH_2=CH-(CH_2)_sCH_3$ s is an integer ranging from 3 to 50 and is equal to n−2.

| Example | s |
|---------|----|
| 21 | 8 |
| 22 | 10 |
| 23 | 12 |
| 24 | 14 |
| 25 | 18 |

5. Hydrosilylation

The hydrosilylation reaction used to make the compounds of this invention is well know to those skilled in the art. One of many references is International Publication (Silicone Alkylene Oxide Copolymers As Foam Control Agents) WO 86/0541 by Paul Austin (Sep. 25, 1986) p.19.

Gene a Reaction Process (Hydrosilylation)

To a suitable flask fitted with a mechanical agitator, thermometer with a Therm-o-watch temperature regulator, nitrogen sparge tube vented reflux condenser and heating mantle is added the specified quantity of methyl undecylenate (example 11), allyl alcohol alkoxylates (examples 12–20), and alpha olefin (examples 21–25) examples. Next is added the specified number of grams of the specified hydrosilylation intermediate (Example #1–10) and isopropanol. The temperature is increased to 85° C. and 3.5 ml of 3% $H_2PtCl_6$ in ethanol is added. An exotherm is note to about 95° C., while the contents are stirred for about 2 hours. During this time silanic hydrogen concentration drops to nil. Cool to 65° C. and slowly add 60 g of sodium bicarbonate. Allow to mix overnight and filter through a 4-micron pad. Distill off any solvent at 100° C. and 1 torr.

Example 26

To a suitable flask fitted with a mechanical agitator, thermometer with a Therm-o-watch temperature regulator, nitrogen sparge tube vented reflux condenser and heating mantle is added 200.0 grams of methyl undecylenate (example 11 ), 915.4 grams of allyl alcohol alkoxylate (example 16), 1687.7 grams of hydrosilylation intermediate Example #15) and 750 grams of isopropanol.

Heat to 85 C. and add 3.5 ml of 3% H 2 PtCl 6 in ethanol. An exotherm is noted to about 95° C., while the contents are stirred for about 2 hours. During this time silanic hydrogen concentration drops to nil. Cool to 65° C. and slowly add 60 g of sodium bicarbonate. Allow to mix overnight and filter through a 4-micron pad. Distill off any solvent at 100° C. and 1 torr.

Examples 26–55

| Example | Silanic Polymer Example | Grams | Allyl Alkoxylate Example 11 | Grams | Alpha Olefin Example | Grams |
|---------|---------|--------|---------|--------|---------|--------|
| 26 | 1 | 2600.8 | 281.0 | 12 | 165.2 | 21 | 0 |

| Ex-am-ple | Silanic Polymer Example | Grams | Allyl Alkoxylate Example | Grams | Alpha Olefin Example | Grams |
|-----------|-------|--------|-------|--------|-------|--------|
| 26 | 1 | 2600.8 | 281.0 | 12 | 165.2 | 21 | 0 |
| 27 | 2 | 2617.0 | 42.0 | 13 | 348.1 | 21 | 0 |
| 28 | 3 | 497.1 | 218.0 | 14 | 2321.2 | 21 | 0 |
| 29 | 4 | 703.4 | 129.5 | 15 | 2188.6 | 21 | 0 |
| 30 | 5 | 1522.5 | 286.4 | 16 | 1238.7 | 21 | 0 |
| 31 | 6 | 522.7 | 46.1 | 17 | 2438.9 | 21 | 0 |
| 32 | 7 | 423.0 | 63.6 | 18 | 2524.0 | 21 | 0 |
| 33 | 8 | 387.3 | 102.1 | 19 | 2527.6 | 21 | 0 |
| 34 | 9 | 543.5 | 254.2 | 20 | 2244.7 | 21 | 0 |
| 35 | 10 | 1360.6 | 710.0 | 12 | 1046.6 | 21 | 0 |
| 36 | 1 | 2064.2 | 222.7 | 13 | 463.5 | 21 | 286.6 |
| 37 | 2 | 1942.5 | 31.1 | 14 | 991.7 | 22 | 39.9 |
| 38 | 3 | 691.9 | 121.3 | 15 | 2050.9 | 23 | 156.1 |
| 39 | 4 | 1223.6 | 225.2 | 16 | 1298.7 | 24 | 289.8 |
| 40 | 5 | 607.9 | 57.2 | 17 | 2270.9 | 25 | 73.6 |
| 41 | 6 | 1229.4 | 108.4 | 18 | 1540.8 | 21 | 139.4 |
| 42 | 7 | 886.1 | 80.0 | 19 | 1978.8 | 22 | 68.5 |
| 43 | 8 | 581.7 | 77.0 | 20 | 2255.8 | 23 | 98.6 |
| 44 | 9 | 1589.3 | 445.5 | 12 | 656.4 | 24 | 382.5 |
| 45 | 10 | 429.1 | 112.1 | 13 | 2333.2 | 25 | 144.3 |
| 46 | 1 | 1261.7 | 136.2 | 14 | 1449.7 | 21 | 175.2 |
| 47 | 2 | 2430.1 | 39.0 | 15 | 437.6 | 22 | 99.9 |
| 48 | 3 | 1038.5 | 182.2 | 16 | 1575.3 | 23 | 234.4 |
| 49 | 4 | 478.9 | 88.2 | 17 | 2334.1 | 24 | 113.4 |
| 50 | 5 | 1182.4 | 111.2 | 18 | 1581.8 | 25 | 143.1 |
| 51 | 6 | 1201.7 | 105.0 | 19 | 1573.8 | 21 | 136.3 |
| 52 | 7 | 1209.9 | 109.8 | 20 | 1605.6 | 22 | 93.6 |
| 53 | 8 | 1799.5 | 237.1 | 12 | 697.9 | 23 | 305.0 |
| 54 | 9 | 665.1 | 124.4 | 13 | 2071.2 | 24 | 160.1 |
| 55 | 10 | 123.1 | 64.3 | 14 | 2740.5 | 25 | 82.8 |
| 56 | 4 | 1066.0 | 197.0 | 13 | 1228.0 | 21 | 0 |
| 57 | 4 | 534.0 | 197.0 | 13 | 409.0 | 21 | 0 |
| 58 | 4 | 355.0 | 197.0 | 13 | 136.0 | 21 | 0 |

Triclosan Reaction

Examples 59–75

The compounds made in examples 26–58 are methyl esters as prepared. They are reacted with triclosan to produce the compounds of the present invention.

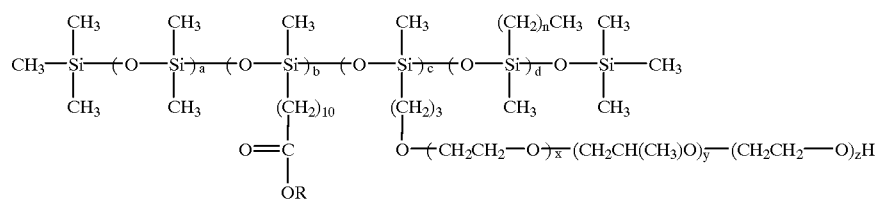

R is:

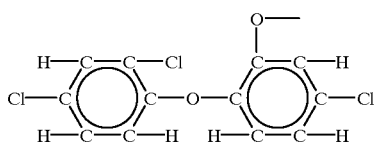

Example 59–75

In a suitable flask equipped with a thermometer, heating mantle, and a condenser to remove methanol is added the specified amount of the specified silicone methyl ester is added 300.0 grams of the specified triclosan. The reaction mass is heated to 190° C. to 200° C. The reaction begins at about 170° C. Allow the methanol to distill off as the reaction proceeds. After the reaction progress is followed by hydroxyl value which meets theoretical within 12 hours.

|  | Methyl Ester | |
| --- | --- | --- |
| Example | Example | Grams |
| 59 | 26 | 3047.0 |
| 60 | 27 | 3007.1 |
| 61 | 28 | 947.2 |
| 62 | 29 | 3021.5 |
| 63 | 30 | 3047.6 |
| 64 | 31 | 3007.7 |
| 65 | 32 | 3028.6 |
| 66 | 33 | 3016.4 |
| 67 | 34 | 3042.4 |
| 68 | 35 | 3117.2 |
| 69 | 36 | 3038.0 |
| 70 | 37 | 3005.3 |
| 71 | 38 | 3020.1 |
| 72 | 39 | 3037.6 |
| 73 | 40 | 3008.1 |
| 74 | 41 | 3017.8 |
| 75 | 42 | 3013.1 |

Thermal Gravimetric Analysis

Measurements were obtained of the weight percent lost for the samples below using a Perkin-Elmer TGA 7 where the temperature was scanned from 40.degree. to 250.degree. at 20.degree. C./minute. At the completion of the temperature scan for each, the following results were obtained:

| Sample | % Weight Loss |
| --- | --- |
| Triclosan | 62 |
| Triclosan Acetate | 12 (U.S. Pat. No. 6,197,072) |
| Silicone Ester (Example 70) | 1 |

U.S. Pat. No. 6,197,072 states "generally, a surface treatment application, such as the mere coating or impregnation within the interstices of fabrics with triclosan esters or triclosan itself, can be easily removed by a high pH detergent solution within a laundry cycle, and thus would not provide a durable, long-lasting antimicrobial treatment for textiles. Triclosan esters diffused within the fibers of a fabric are not in contact with the washing liquid and therefore cannot be easily removed. However, the triclosan ester within the fiber has the ability to migrate to the fiber surface at a very slow rate in order to provide the antimicrobial effect on the substrate." The compounds of the present invention are more to substrate, withstanding far more washings.

The compounds of the present invention provide antimicrobial action when applied to hair, skin, textile fiber and other porous substrates. Such properties make the compounds of the present invention useful in a variety of applications, where antimicrobial action is desires. These include paper towels and tissues.

What is claimed:

1. A silicone polymer conforming to the following structure:

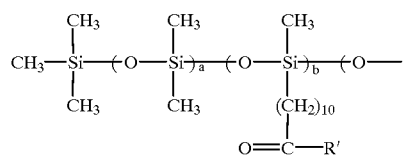

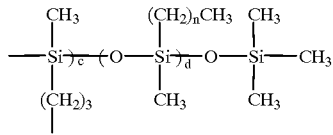

$O-(CH_2CH_2-O)_{\overline{x}}-(CH_2CH(CH_3)O)_{\overline{y}}-(CH_2CH_2-O)_zH$ wherein;
 a is an integer ranging from 0 to 2000;
 b is an integer ranging from 1 to 20;
 c is an integer ranging from 1 to 20;
 d is an integer ranging from 0 to 20;
 n is an integer ranging from 10 to 20;
 x is an integer ranging 0 to 20;
 y is an integer ranging 0 to 20;
 z is an integer ranging 0 to 20;
 R is:

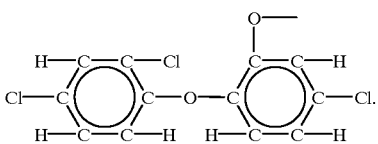

2. A silicone polymer of claim 1 wherein d is 0.
3. A silicone polymer of claim 1 wherein d in an integer ranging from 1 to 5.
4. A silicone polymer of claim 1 wherein b is an integer ranging from 6 to 20.
5. A silicone polymer of claim 1 wherein c is an integer ranging from 1 to 5.
6. A silicone polymer of claim 1 wherein c in an integer ranging from 6 to 20.
7. A silicone polymer of claim 1 wherein a is an integer ranging from 1 to 5.
8. A silicone polymer of claim 1 wherein a in an integer ranging from 6 to 20.

* * * * *